R. McRAE.
Combined Cotton Chopper and Scraper.
No. 161,256. Patented March 23, 1875.
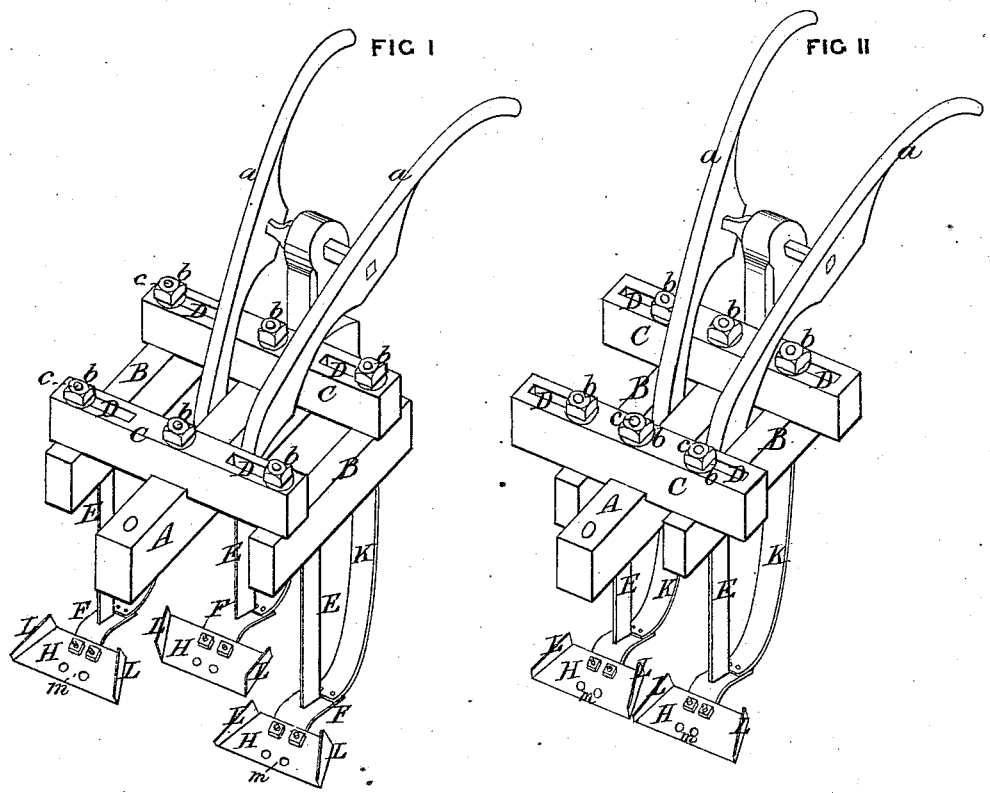
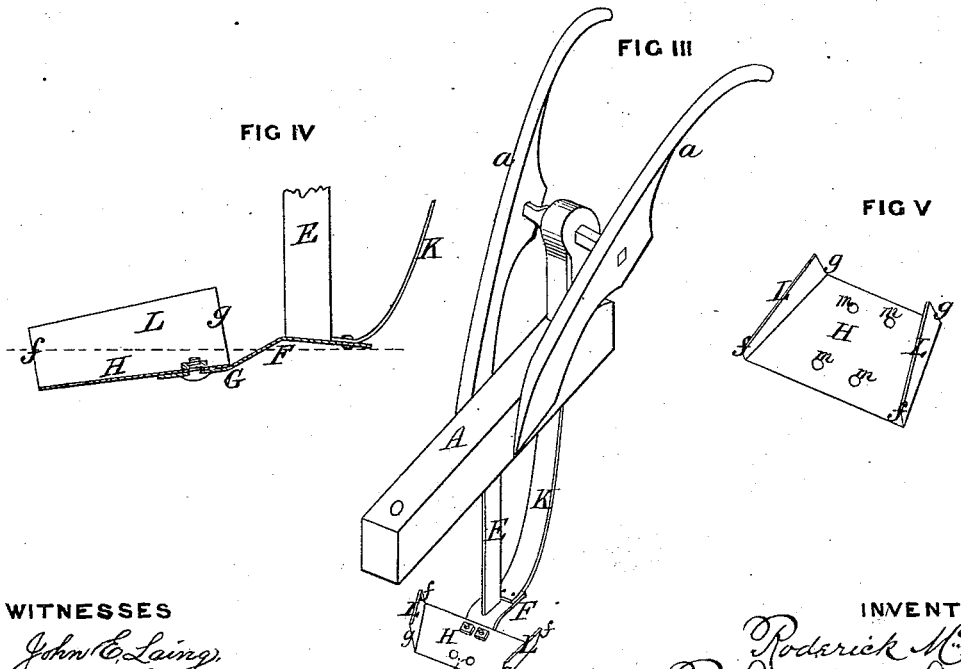
WITNESSES
John E. Laing
J. H. Rutherford
INVENTOR
Roderick McRae
By Johnson and Johnson
his Attys

UNITED STATES PATENT OFFICE.

RODERICK McRAE, OF FAYETTEVILLE, NORTH CAROLINA.

IMPROVEMENT IN COMBINED COTTON CHOPPERS AND SCRAPERS.

Specification forming part of Letters Patent No. 161,256, dated March 23, 1875; application filed December 1, 1874.

*To all whom it may concern:*

Be it known that I, RODERICK McRAE, of Fayetteville, in the county of Cumberland and State of North Carolina, have invented certain new and useful Improvements in Combined Cotton Chopper and Scraper; and I do hereby declare that the following is a full, clear, and exact description thereof, which will enable others skilled in the art to which it pertains to make and use the same, reference being had to the accompanying drawings, and to the letters of reference marked thereon, which form a part of this specification.

This invention relates to a combined chopper and scraper designed for chopping or thinning out cotton-plants and cultivating or scraping cotton and other growing crops, the construction of the frame and chopping or scraping shares being such that the machine can be used for performing either of the operations referred to by simply changing the relative positions of the scrapers in respect to each other.

The invention chiefly consists in the employment of reversible scraping-shares or chopping-blades having bent-up converging sides so disposed in respect to the share or blade proper that the ends of the same vary in width, in order to enable the shares to be used either end foremost for chopping and cultivating purposes, the share, when the wide end is in front, being in position for scraping as the lateral turned-up sides are, in this instance, inclined in an inward direction, by throwing the loosened earth, weeds, and grass away from the growing crop. By reversing the shares so as to bring the narrower cutting-edge foremost, the turned-up sides or flanges are turned in an outward direction, so as to throw the chopped-out cotton-plants away from the plants left standing.

In the accompanying drawings, Figure 1 is a perspective view, showing the combination of three scrapers or cultivating-shares adapted especially for use upon level land. Fig. 2 is a perspective view with the central scraper removed, and showing the other two scrapers brought close together. Fig. 3 is a perspective view, showing a single chopping-blade applied in position, the cross-frame and adjustable side beams being removed. Fig. 4 is a detail perspective view of the guide-heel, scraper-supporting plate, and attaching-standard or colter; and Fig. 5, a detail view of the reversible scraping-share or chopping-share with its double series of bolt-holes.

The frame represented in Figs. 1 and 2 is designed for the reception of either three or two scraping-shares, and is composed of a central beam, A, having the guide-handles $a$, the two side beams B B, and the transverse bars C C. Said bars are securely fastened to the central beam by bolts and nuts $b$, and they are provided at their ends with slots D D, through which pass the bolts $c$, employed for securing the side beams to the cross-bars. By loosening the nuts of said bolts the side beams can be adjusted laterally, so as to bring them close together or far apart. When the three beams are combined in the manner set forth each one carries a standard or colter, E, which is generally cast or formed in one piece with a horizontal, or nearly horizontal, base-shoe, F. The forward portion of said shoe is bent down or set at an angle in respect to the heel proper, so as to form an inclined supporting or attaching plate, G, Fig. 4, for the scraping-share or chopping-blade H. The standard E has a longitudinal attaching-plate at its upper end, and it may, when deemed desirable, be braced by a supplementary standard or arm, K, which is secured both to the attaching-plate and to the heel-piece. The shares or blades H, which are novel both as to their construction and use, are made of a flat plate of steel, the side edges of which are turned up, so as to form vertical lateral flanges L. Said turned-up sides extend at an angle in respect to the flat portion of the scraper-plate, so as to cause the same to be provided with two cutting-ends, $f$ $g$, of varying widths. When the wider end is in front the turned-up sides converge or extend in an inward direction, and when in this position the share is used as a scraping or cultivating share.

In Fig. 1 there is represented triple scraper, two parallel scraping-shares being, in this instance, arranged in advance of, and at the sides of, a third scraper-share, attached to the central beam. When the parts are relatively arranged, as last described, the two front scrapers will run at the sides of two rows of plants for cultivating and scraping the ground, the third one following, and operating in a like manner in the central space between two ridges or rows. As the turned-up sides of the shares are inclined in an inward direction toward the rear of the share-plate, the loosened earth, weeds, and grass will be conducted away from the standing crop, so as to avoid being thrown upon the same. The angle given to the share-supporting plate causes the share to run at a corresponding pitch or angle, thus facilitating its passage through the earth, and tending to insure a perfect loosening of the soil and cutting of all weeds, as shown in Fig. 4. The guide-heel F runs on the surface of the ground, and prevents also a too deep penetration of the share into the soil.

The triple form of machine is specially adapted for use upon level land. By removing the rear scraper from the central beam, and properly adjusting the side beams, the two parallel scrapers are brought close together, and when so arranged they accomplish the same result as three scrapers.

The machine or implement is converted into a chopper by removing the cross-frame and side beams, so as to leave only the main beam of the frame, as shown in Fig. 3. The share or blade is then turned around or reversed, so as to bring its narrower end in front, the turned-up sides converging in this position in an outward direction.

By running the machine across a row of cotton-plants the share H will act as a chopping-blade and remove or cut out a bunch of plants the width of the blade. The turned-up sides of the chopping-blade serve, in this instance, to prevent the loosened earth from being thrown upon the plants left standing by conducting the same to the rear of the blade, where it is discharged. They also serve to cut the earth and such plants as they may come in contact with. A double set of holes, $m$, must be made in the share or blade for attaching the same reversibly to its supporting-plate by means of bolts and nuts.

I claim—

The reversible double-edged scraping-share and chopping-blade H, having turned-up sides or vertical oblique flanges L to adapt the same for use, in the manner and for the purpose herein set forth.

In testimony that I claim the foregoing as my own I have affixed my signature in presence of two witnesses.

RODERICK McRAE.

Witnesses:
J. C. STEDMAN,
A. A. McKETHAN, Jr.